(12) United States Patent
Schmidt et al.

(10) Patent No.: US 11,769,189 B2
(45) Date of Patent: Sep. 26, 2023

(54) COMPUTER-IMPLEMENTED METHOD FOR PREPARING OFFER AND/OR ORDER DATA OF AN OBJECT TO BE INDIVIDUALIZED

(71) Applicant: Giffits GmbH, Hamburg (DE)

(72) Inventors: Thorsten Schmidt, Hamburg (DE); Marcus Schulz, Hamburg (DE)

(73) Assignee: GIFFITS GMBH, Hamburg (DE)

( * ) Notice: Subject to any disclaimer, the term of this patent is extended or adjusted under 35 U.S.C. 154(b) by 550 days.

(21) Appl. No.: 16/559,478

(22) Filed: Sep. 3, 2019

(65) Prior Publication Data

US 2020/0082450 A1 Mar. 12, 2020

(30) Foreign Application Priority Data

Sep. 7, 2018 (EP) .................................... 18193152

(51) Int. Cl.
*G06Q 30/00* (2023.01)
*G06Q 30/0601* (2023.01)
(Continued)

(52) U.S. Cl.
CPC ......... *G06Q 30/0621* (2013.01); *G06F 9/451* (2018.02); *G06Q 30/0239* (2013.01)

(58) Field of Classification Search
CPC . G06Q 30/0621; G06Q 30/0239; G06F 9/451
See application file for complete search history.

(56) References Cited

U.S. PATENT DOCUMENTS

| 2011/0216062 A1* | 9/2011 | Thomas-Lepore ..... G06T 15/60 345/420 |
| 2013/0173415 A1* | 7/2013 | Harvill ................... G06Q 30/06 705/26.5 |

(Continued)

FOREIGN PATENT DOCUMENTS

WO 2010/014750 A1 2/2010

OTHER PUBLICATIONS

Customization, What is Mass. "Mass Customization." (2010).*

(Continued)

*Primary Examiner* — Kathleen Palavecino
(74) *Attorney, Agent, or Firm* — SoCal IP Law Group LLP; Angelo Gaz

(57) ABSTRACT

The invention relates to a computer-implemented method for preparing offer and/or order data of an object to be individualized, wherein the method comprises the following steps: providing a purchasing system having a user interface, an inventory management system and a data interface between the purchasing system and the inventory management system in a computer system; providing individualization data for individualizing the object in a storage unit of the computer system; receiving a first user input comprising object selection data of the object to be individualized via the user interface, receiving a further user input comprising at least one selected selection position for individualization data on the object to be individualized; transmitting data via the data interface after at least one of the above-mentioned steps between the purchasing system and the inventory management system, wherein the data comprise the object selection data, the at least one selected selection position.

20 Claims, 5 Drawing Sheets

(51) Int. Cl.
*G06F 9/451* (2018.01)
*G06Q 30/0207* (2023.01)

(56) References Cited

U.S. PATENT DOCUMENTS

2014/0258020 A1 9/2014 Greene
2015/0055085 A1 2/2015 Fonte

OTHER PUBLICATIONS

Gehring, Sven, et al. "Mobile product customization." CHI'10 Extended Abstracts on Human Factors in Computing Systems. 2010. 3463-3468.*
European Patent Office, Extended European Search Report for EP Application No. 18193152.8, dated Dec. 20, 2018, 11 pages.

* cited by examiner

COMPUTER-IMPLEMENTED METHOD FOR PREPARING OFFER AND/OR ORDER DATA OF AN OBJECT TO BE INDIVIDUALIZED

The invention relates to a computer-implemented method for preparing offer and/or order data of an object to be individualized.

A variety of aids can be used for the interactive configuration of multipart objects. Thus, if a trademark of a customer is to be printed on a promotional item, for example, a ballpoint pen, firstly a sales platform can offer a three-dimensional view of the article. The customer can then select an article and determine the desired position of the trademark. A digital representation of the selected article is provided by the service providers by means of various special programs with the trademark of the customer at the position desired by the customer and shown to the customer. If the customer wishes a different positioning of the trademark, this process is repeated. As soon as the final position has been established, the data are exported and imported into another special program. A price computation is carried out using further special programs. An offer for the customer is prepared based on the price computation which is carried out using still other special programs after further data exports and data imports.

The object is thus to provide an improved computer-implemented method for preparing offer and/or order data of an object to be individualized.

The main features of the invention are specified herein.

In a computer-implemented method for preparing offer and/or order data of an object to be individualized, it is provided according to the invention that the method comprises the following steps: providing a purchasing system having a user interface, an inventory management system, and a data interface between the purchasing system and the inventory management system in a computer system; providing individualization data for individualizing the object in a storage unit of the computer system; receiving a first user input comprising object selection data of the object to be individualized via the user interface, receiving a further user input comprising at least one selected selection position for individualization data on the object to be individualized; transmitting data via the data interface after at least one of the above-mentioned steps between the purchasing system and the inventory management system, wherein the data comprise at least the object selection data, the at least one selected selection position, a data set of object data of the object to be individualized, wherein the object data define object components and at least two selection position for the individualization data on an object, object configuration data, which are based on the at least one selected selection position, the object data, and the individualization data, and/or price data based on the object configuration data; and generating offer and/or order data for the object to be individualized from the price data and the object configuration data by means of the inventory management system.

An object to be individualized is understood in this case as an object on which, for example, an individual symbol is to be printed. The individualization data in the storage unit are used in this case for the definition of the individual symbol.

A computer-implemented method is provided by the invention, which provides a data interface between a purchasing system and an inventory management system. The purchasing system and the inventory management system can be application modules of an application. The data interface functions in this case within the method between the purchasing system and the inventory management system as a data exchange means. In this case, the data can be transmitted in both directions, i.e., from the purchasing system to the inventory management system and from the inventory management system to the purchasing system. The data interface between the application modules is automatically used, so that no manual usage of the data interface takes place. The data can thus be exchanged directly between the purchasing system and the inventory management system without action of the user. Multiple data interfaces can also be provided.

The transmission of the data via the data interface can be executed individually for each of the listed data. Furthermore, the mentioned data are not necessarily all transmitted simultaneously, but rather can be transmitted in succession, wherein further steps of the method can be carried out between each transmission of data. Thus, the object selection data can be transmitted between the reception of the first user input and the reception of the second user input by the purchasing system. Before the next data transmission via the data interface, further steps of the method can be carried out. Furthermore, the data can comprise a list of objects to be individualized, in order to simplify a selection of the object to be individualized. This list can be transmitted in this case to the purchasing system before the reception of the first user input by the inventory management system.

The data interface thus functions as a direct communication channel between the purchasing system and the inventory management system. Resources can be saved by this direct communication and the effort for the preparation of offer or order data can be reduced.

A computer-implemented method is thus provided, which improves the applicability and the speed for preparing offer and/or order data of an object to be individualized by means of a data interface. Furthermore, manual data transfers and/or the export and import of data from the or into the application, respectively, are avoided, so that the compilation of offer and order data can take place directly after the user inputs of the user. This accelerates the overall method and reduces the costs.

The steps of the method can be executed in an arbitrary sequence in consideration of logical aspects.

Furthermore, the method can comprise the following step before the reception of the first user input: displaying a digital representation of objects to be individualized via the user interface; and selecting one of the objects to be individualized by way of a user to generate the object selection data.

In this case, a user can firstly generate object selection data of an object to be individualized using the purchasing system via the user interface, i.e., the user searches for an object which is to be individualized. A plurality of objects which come into consideration for an individualization can be displayed via the user interface in this case to the user, from which the user then selects one object to be individualized.

In one example, after the reception of a first user input, the object selection data can be transmitted from the purchasing system to the inventory management system, wherein the inventory management system comprises a database which comprises object data for a plurality of objects; wherein the method comprises the following step; preparing the data set from the object data based on the object selection data by means of the inventory management system; wherein the data set is transmitted from the inventory management system to the purchasing system.

On the basis of the object selection data, a data set of object data can thus be prepared. The data set comprises the object data of the corresponding object. The purchasing system, immediately after the user has selected the product to be individualized, thus communicates with the inventory management system via the data interface. Object data are thus provided to the purchasing system by the inventory management system directly after the selection, which the purchasing system can further process for the further selection and individualization process.

In a further additional or alternative example, the method can comprise the following step before the reception of the further user input: generating a digital representation from the object data of the data set and projecting a symbol based on the individualization data at an arbitrary selection position.

In this case, in addition to the possible selection positions, the object data can also comprise the shape and the appearance of the object, which can be used for the preparation of a digital representation of the object. Therefore, selection positions for the individualization data can be displayed on the object. The possible selection positions can thus be presented to the user directly after his selection of the object. The user thus does not first have to wait for the possible suggestions about the point of the object at which an individualization can take place. Using the purchasing system, the user can now select at which of the selection positions the individualization is to take place. The user can also select multiple selection positions in this case. The object can be displayed in an all-around view in this case. A user can select the orientation of the object via the user interface to obtain views from various viewing angles of the object.

In this case, the projection of a symbol can comprise the following substep: preparing a representation of the symbol which is adapted to the selection position.

The symbol can be a three-dimensional representation of the individualization data generated from a rendering method in this case. Alternatively, the symbol can be a two-dimensional representation of the individualization data.

Furthermore, a digital representation of the object can thus be provided which comprises a realistic view of the object. A user can thus directly assess how the individualization data appear at the selection position selected by him.

In one example, the digital representation can comprise at least two representation levels, wherein one of the at least two representation levels comprises a first partial representation of the object and a further of the at least two representation levels comprises at least one further partial representation of the object.

The partial representations can together provide an overall representation of the object. In other words, the representation levels can be overlaid to generate the overall representation of the object. Individual partial representations of the object can thus be exchanged or manipulated without changing the other partial representations.

Furthermore, the method can comprise the following step after the reception of the further user input: preparing the object configuration data from the object data of the data set, the at least one selected selection position, and the individualization data by means of the purchasing system; determining price data based on the object configuration data by means of the purchasing system; wherein the price data and the object configuration data are transmitted from the purchasing system to the inventory management system.

Using the selected selection positions, the individualization data, and the object data, object configuration data can be prepared by the purchasing system and price data can be determined for this purpose. The price data and the object configuration data are transmitted via the data interface to the inventory management system. The inventory management system prepares offer and/or order data from the price data and the object configuration. This simplifies and accelerates the preparation of offer and order data.

The user interface can be a web browser. In this way, a user can carry out a configuration of an object to be individualized via the Internet. This simplifies the method.

The object data can define a manufacturing method which is linked to at least a part of the object data.

In this manner, the object data are linked directly to the manufacturing method, so that these items of information can be taken into consideration in the ascertainment of the prices and the duration of the production.

The method can comprise the following step before the generation of offer and/or order data: displaying the object configuration data and the price data via the user interface.

The object data can comprise object component data, printing positions, which define the selection positions, and can comprise combination data, wherein the combination data define rules for the combination of object component data and selection positions.

Furthermore, a computer system is provided, wherein the computer system comprises: an input unit; an output unit; a storage unit; and a processor unit; wherein the input unit is designed to receive user inputs; wherein the storage unit is designed to provide individualization data for individualizing the object; wherein the processor unit is designed to carry out the method according to the above description; and wherein the output unit is designed to output offer and/or order data.

Furthermore, a computer program product having instructions executable on a computer is provided, which instructions, when executed on a computer, cause the computer to carry out the method according to the preceding description.

Further features, details, and advantages of the invention result from the wording of the claims and from the following description of exemplary embodiments on the basis of the drawings. In the figures:

Figure 1:
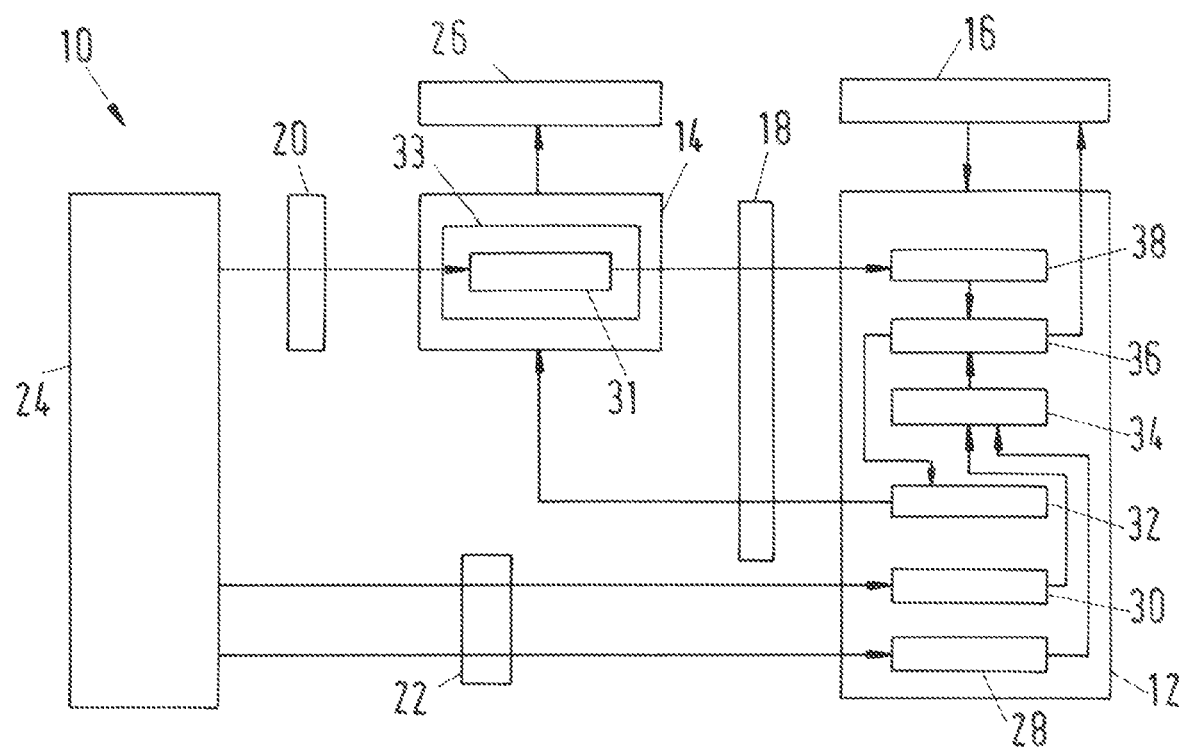
FIG. 1 shows a schematic illustration of the application modules.

An example of the computer-implemented method for preparing offer and/or order data of an object to be individualized is explained in greater detail hereafter on the basis of an application 10.

The application 10 comprises a purchasing system 12, which can be a sales platform, which is linked to a web browser 16, an inventory management system 14, and an author system 24. A data interface 18 connects the purchasing system 12 to the inventory management system 14. A further data interface 20 connects the inventory management system 14 to the author system 24. Furthermore, the author system 24 is linked via a third data interface 22 to the purchasing system 12.

Data can be exchanged between the associated systems via the data interfaces 18, 20, 22. The data exchange can take place without manual aid in this case.

The application 10 can be executed on a processor unit 76 of a computer system 70. In this case, individualization data 52 for individualizing the object 60 can be provided in a storage unit 78 of the computer system 70.

Master data for objects 60 to be individualized can be provided using the author system 24. Master data can comprise in this case components and rules 31, level data 30, and/or 3D data 28. Level data 30 can comprise in this case image data of the objects 60 to be individualized, which provide a digital representation of the object 60 when overlaid on one another. That is to say, each level comprises a part of the digital representation of an object and all levels which are associated with one of the objects 60 to be individualized may be overlaid to form an overall representation of this object 60.

The 3D data 28 can provide data which can generate a three-dimensional view from the level data 30 of the objects 60. In this case, the 3D data 28 can be associated with individual levels of the digital representation of the objects 60.

The components and rules 31 comprise data about parts of the objects 60 to be individualized and rules which define how the parts are assembled and at which points of the parts selection positions 62, 64, 66 can be provided.

The components and rules 31 can be transmitted from the author system 24 via the data interface 20 to the inventory management system 14. Furthermore, the level data 30 and the 3D data 28 can be transmitted via the data interface 22 from the author system 24 to the purchasing system 12.

The components and rules 31 can be stored in a database 33 in the inventory management system 14. The database 33 can individually associate the components and rules 31 with objects 60 to be individualized in this case.

By means of the data interface 18, a part of the components and rules 31 of the database 33 can be transmitted to the purchasing system 12 as components and rules 38.

The purchasing system 12 comprises a checkout module 32, a visualization module 34, and a control module 36.

Figure 2:
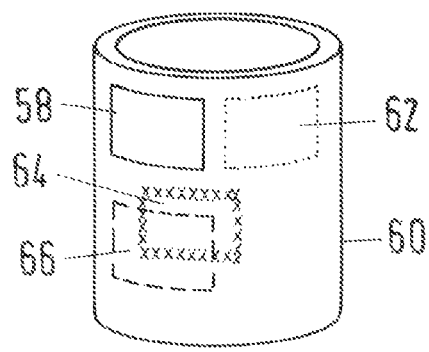
FIG. 2 shows a schematic illustration of an object to be individualized.

FIG. 2 shows an object 60 to be individualized on the basis of the example of a cup. Multiple selection positions 62, 64, 66 are arranged on the cup. In FIG. 2, the selection positions 62, 64, 66 are solely to be viewed as examples. A plurality of selection positions 62, 64, 66 overlapping with one another can also be provided on the object 60. According to FIG. 2, a symbol 58, which was generated from the individualization data 52, is arranged at one of the selection positions. Multiple symbols 58, which were generated from the individualization data 52, can also be arranged at various selection positions 62, 64, 66.

Figure 3:
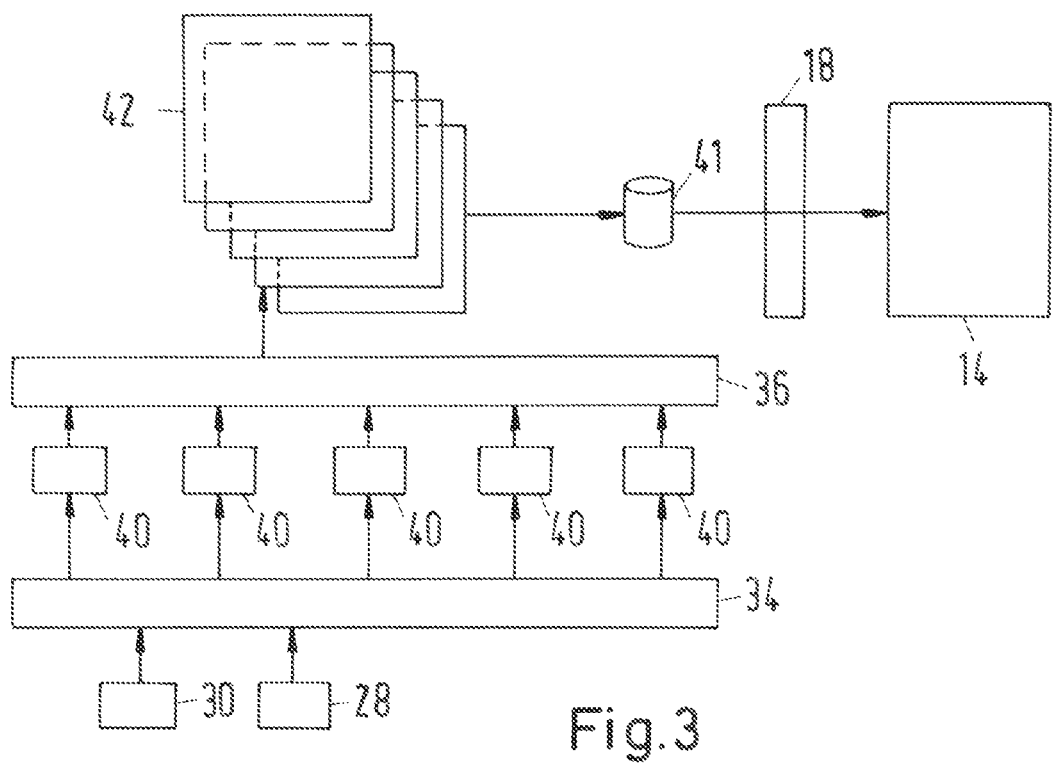
FIG. 3 shows a schematic illustration of a part of the purchasing system.

The level data 30 and the 3D data 28 can be compiled according to FIG. 3 by the visualization module 34 to form a digital representation of an object 60 to be individualized. The digital representation can comprise data 40 about images, colors, and three-dimensional logos in this case.

The visualization module 34 transmits the data 40 to the control module 36. Using the data 40, the control module 36 prepares at least two representation levels 42, which, in the overlay thereof, display a digital representation of the object 60 to be individualized. Using the items of information about the digital representation, the control module 36 instructs the browser 16 to display the object 60 to be individualized. Via the web browser 16, in this case a user can, on the one hand, select an object 60 to be individualized from an array of objects 60 to be individualized in the scope of a first user input and, on the other hand, can observe and manipulate the digital representation of the object 60 to be individualized.

Object selection data 41 are prepared with the selection of the object 60 to be individualized. The object selection data 41 can be generated in this case by the control module 36. Furthermore, the object selection data 41 are transmitted via the data interface 18 to the inventory management system 14.

Figure 4:
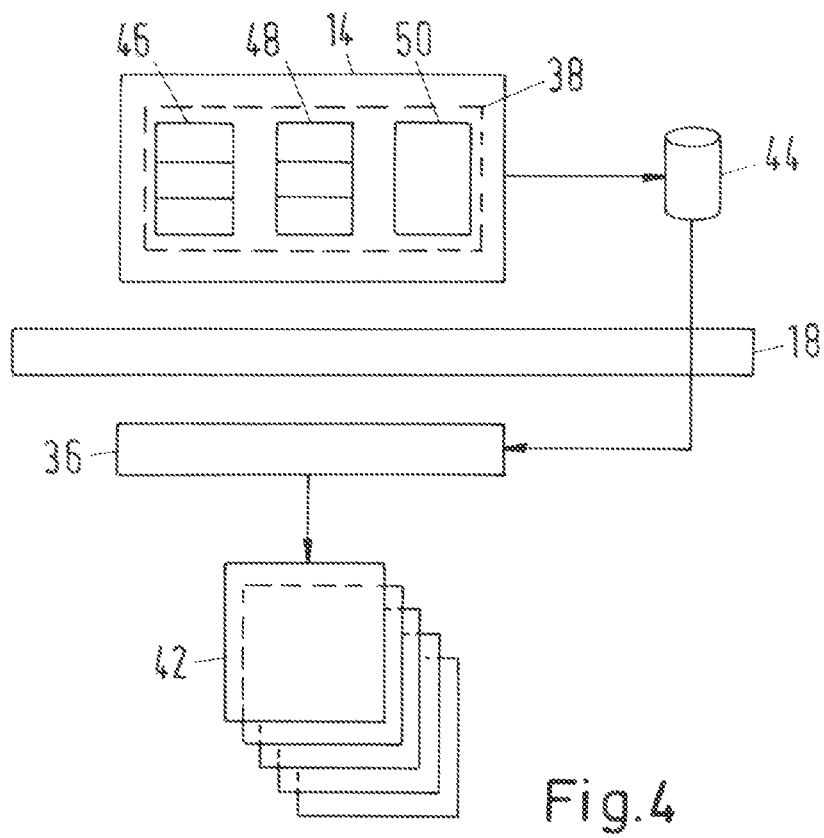
FIG. 4 shows a schematic illustration of the data interface between the inventory management system and the purchasing system.

According to FIG. 4, the inventory management system 14 comprises the database 33, in which the object data 46, 48, 50 can be stored. The object data 46, 48, 50 can comprise in this case object component data 46, printing positions 48 for the definition of selection positions 62, 64, 66, and combination data 50, wherein the combination data 50 define rules for the combination of object component data 46 and selection positions 62, 64, 66.

Furthermore, manufacturing methods for at least a part of the object data can be linked to the object data 46, 48, 50. For this purpose, for example, some object components can be linked to specific production methods and/or some printing positions 48 can be linked to specific printing methods.

The linked production methods can also be considered as production methods. In this case, based on the example of most plastics, they can thus comprise injection molding methods, based on the example of wood or metals, they can comprise machining shaping methods, for example, milling or turning, or based on the example of thin metal parts, for example, aluminium clips of USB sticks or spectacle earpieces, they can comprise laser cutting or stamping methods, based on the example of metal parts, such as clips or lanyards, they can comprise bending or edging methods, or based on the example of fabrics, for example, lanyards or umbrellas, they can comprise weaving methods. In the case of logo fruit gummy candies, for example, mogul methods can be used. Furthermore, in the case of foods, for example, logo fruit or fortune cookies, or plants such as logo lawns, food-modifying methods or special preparation methods can be used. Surfaces can furthermore be modified by means of anodizing or, in the case of optical components, using optical grinds. Furthermore, silicone components can be, for example, cast, extruded, or chemically hardened.

The printing methods can be in this case mask-based printing methods, for example, screen printing methods, pad printing methods, or etching methods. Furthermore, printing methods can also be understood to include plastic methods, for example, engraving, embossing, or coating methods such as doming. Methods which modify the surface of the object 60 to be individualized, for example, laser engraving, can also be used as printing methods. Furthermore, photoprinting methods, for example, direct printing, photo-transfer printing, or laser raster engraving or also digital printing are possible. Furthermore, forming methods such as stamping methods or laser stamping methods can be used as printing methods.

If the object 60 to be individualized is assembled from multiple components, the object data 46, 48, 50 can also comprise items of information about the assembly of the components. This can be the case, for example, with ballpoint pens, lanyards, umbrellas, sunglasses, USB sticks, or gift baskets.

Using the object selection data 41, the inventory management system 14 can prepare a data set 44 from the object data 46, 48, 50. In this case, this data set 44 comprises the object data 46, 48, 50 which are associated with the selected object 60 to be individualized.

The inventory management system 14 transfers the data set 44 via the data interface 18 to the purchasing system 12.

The purchasing system 12 prepares a digital representation of the object 60 via the visualization module 34 using the object data 46, 48, 50, wherein the selection positions 62, 64, 66 are marked on the object 60. In this case, the digital representation is a photorealistic representation of the object 60. The digital representation of the object 60 can be displayed in this case in the web browser 16.

A symbol 58, which is based on the individualization data 52, is projected at an arbitrary one of the selection positions 62, 64, 66. In this case, the symbol 58 can be a three-dimensional representation of the individualization data 52, wherein the symbol 58 can have originated, for example, from a rendering method of the individualization data 52. In this case, the symbol 58 can be adapted so that it fits at the corresponding selection positions 62, 64, 66.

The user can select a different selection position 62, 64, 66, at which the symbol 58 is displayed. In this case, the symbol 58 is adapted accordingly for each selection position 62, 64, 66.

Furthermore, in the scope of a further user input, the user can define one or more selection positions 62, 64, 66 as selected selection positions 62, 64, 66, at which the individualization data 52 are to be positioned in the form of a symbol 58 in the case of the object 60 to be individualized.

From this definition, object configuration data 43 are prepared, which comprise the selected selection positions 62, 64, 66, the individualization data 52, and the object data 46, 48, 50.

Figure 5:
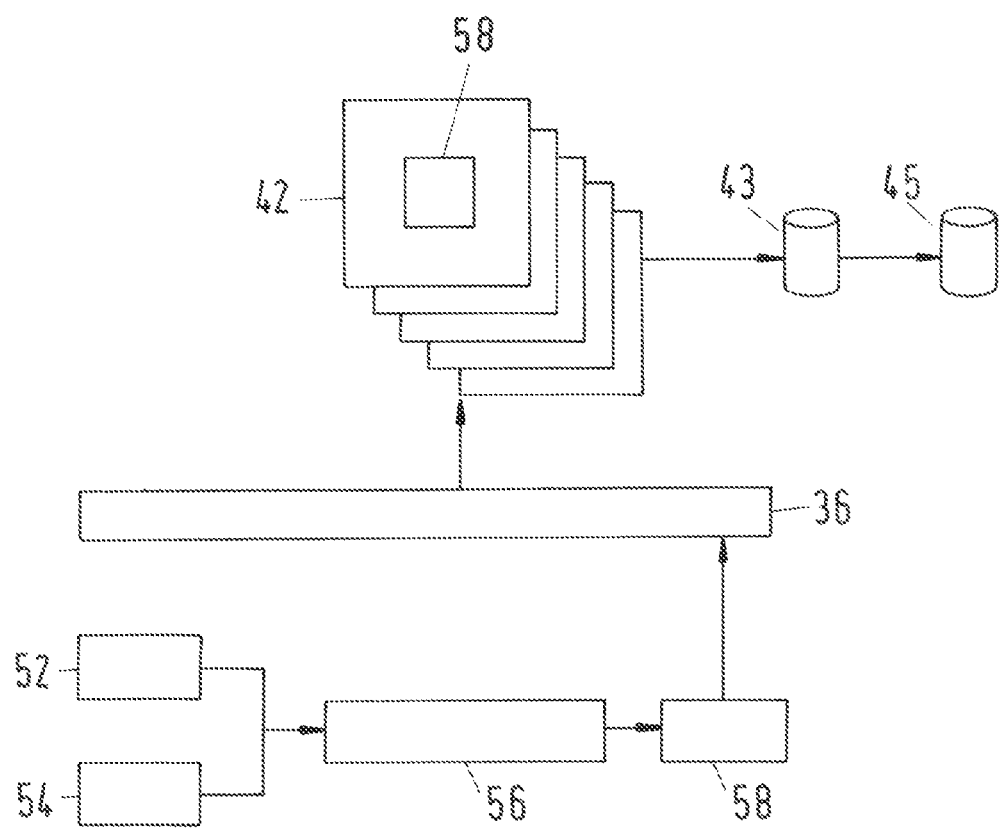
FIG. 5 shows a schematic illustration of a further part of the purchasing system.

The individualization data 52 can also be stored in the object configuration data 43 directly as the symbol 58. Alternatively, according to FIG. 5, the individualization data 52 can be adapted more accurately to the selected selection positions 62, 64, 66. This can be performed by a 3D rendering system 56, which adapts the individualization data 52 to three-dimensional printed surfaces 54 of the object.

Furthermore, price data 45 can be determined from the object configuration data 43, wherein the object component data 46, the selection positions 62, 64, 66, and the individualization data 52 to be arranged, which are stored in the object configuration data 43, are taken into consideration. In this case, the price data 45 can comprise, for example, material costs, production costs, distribution costs, and/or transportation costs.

Figure 6:
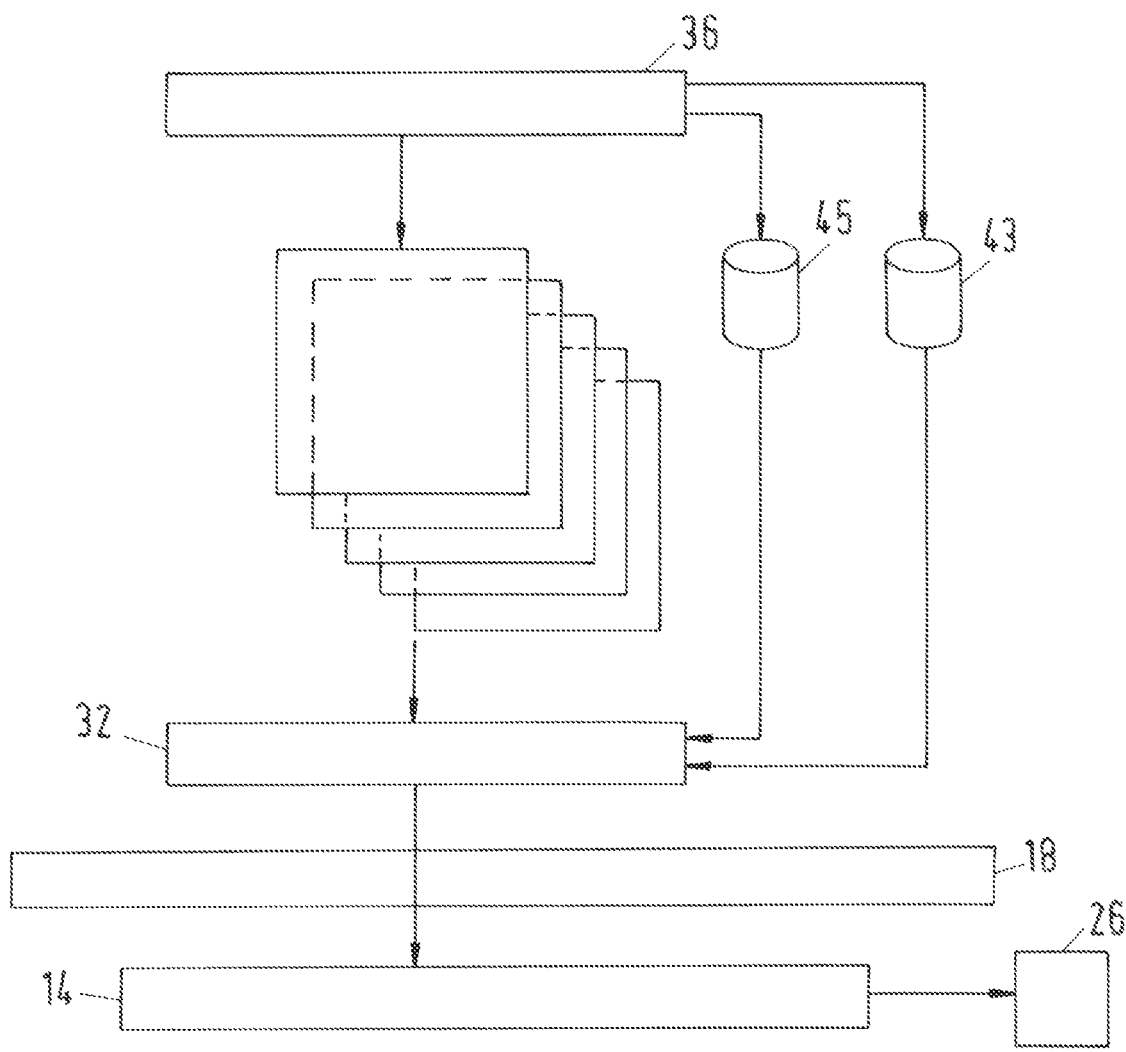
FIG. 6 shows a further schematic illustration of the data interface.

The price data 45 and the object configuration data 43 can be displayed to the user using an output unit 74. After the user has confirmed the price indicated by the price data 45, the price data 45 and the object configuration data 43 can be transmitted according to FIG. 6 from the checkout module 32 of the purchasing system 12 by means of the data interface 18 to the inventory management system 14. The inventory management system 14 can prepare offer and/or order data 26 for the object 60 therefrom.

A data transmission between the purchasing system 12 and the inventory management system 14 can therefore be executed between arbitrary steps of the application.

Figure 7:
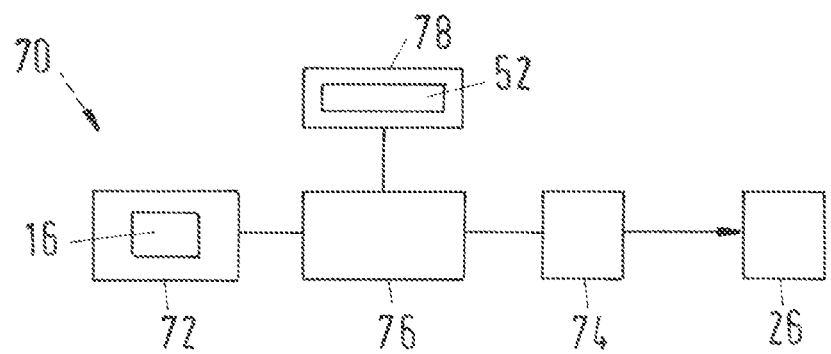
FIG. 7 shows a schematic illustration of the computer system.

FIG. 7 shows a computer system 70, which comprises an input unit 72, an output unit 74, a processor unit 76, and a storage unit 78. The input unit 72 is used to receive user inputs. In this case, the user can make a selection about an object to be individualized, which is displayed to him in a web browser 16, for example, by means of the input unit 72 in the scope of the first user input.

The processor unit 76 can carry out the above-described method. The processor unit executes the application 10 in this case, using which the purchasing system 12, the data interface 18, and the inventory management system 14 are executed.

The offer and/or order data 26 can be output using the output unit 74. In this case, the offer and/or order data 26 can be filled out directly in forms and possibly printed out.

Figure 8:
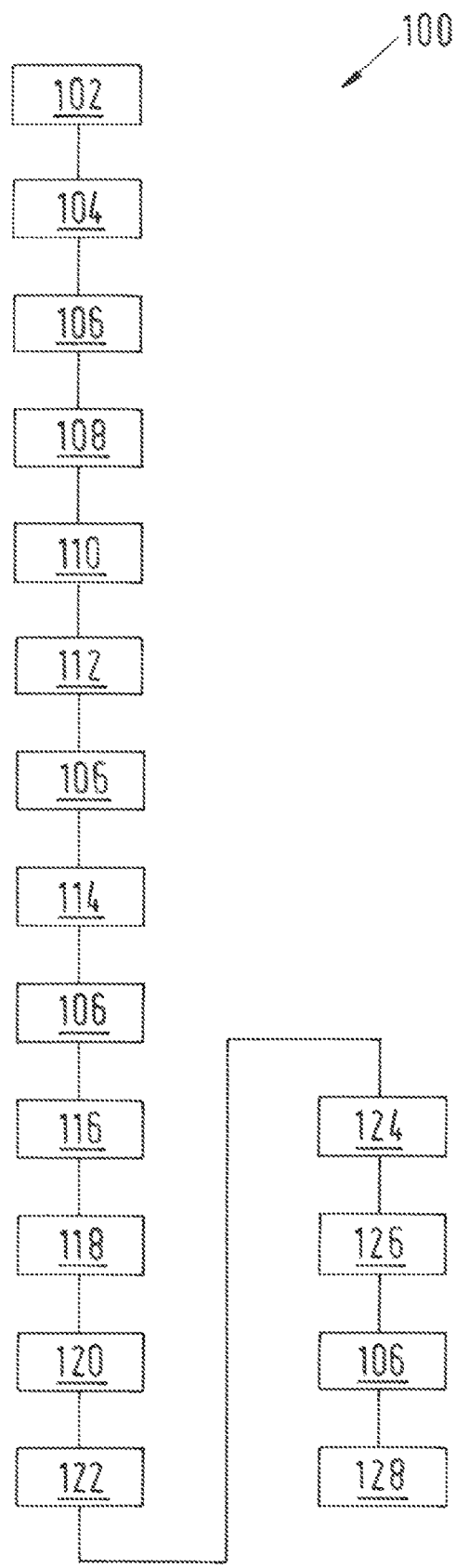
FIG. 8 shows a flow chart of the method.

FIG. 8 shows the method steps of the method 100 for preparing offer and/or order data 26 of an object 60 to be individualized.

In a first step 102, a purchasing system 12 is provided having a user interface 16, an inventory management system 14, and a data interface 18 between the purchasing system 12 and the inventory management system 14 in a computer system 70. The purchasing system 12 and the inventory management system 14 can be executed in this case as applications by the computer system 70. Furthermore, the user interface 16 can be a web browser.

With a further step 104, individualization data 52 for individualizing the object 60 can be provided in a storage unit 78. A user can thus provide individualization data which are to be displayed as a basis for an individual symbol on an object 60 to be individualized.

Furthermore, the method comprises step 106, using which data are transmitted via the data interface 18 to the purchasing system 12 and the inventory management system 14, wherein step 106 can be repeated at arbitrary logically suitable points. The data can comprise in this case, for example, the object selection data 41, the at least one selected selection position 62, 64, 66, a data set 44 of object data 46, 48, 50 of the object 60 to be individualized, wherein the object data 46, 48, 50 define object components and at least two selection positions 62, 64, 66 for the individualization data 52 on an object 60, object configuration data 43, which are based on the at least one selected selection position 62, 64, 66, the object data 46, 48, 50, and the individualization data 52, and/or price data 45 based on the object configuration data 43. After step 102, for example, data which comprise a list of objects 60 to be individualized can be transmitted from the inventory management system 14 to the purchasing system 12. Furthermore, the object data 46, 48, 50 can define a manufacturing method, which is linked to at least a part of the object data. The object data can furthermore comprise object component data 46, printing positions 48, which define the selection positions 62, 64, 66, and can comprise combination data 50, wherein the combination data 50 define rules for the combination of object component data 46 and selection positions 62, 64, 66.

In a step 108, a digital representation of objects 60 to be individualized can be displayed via the user interface. This representation can be manipulated by a user. The digital representation can comprise at least two representation levels 42, wherein one of the at least two representation levels 42 comprises a first partial representation of the object 60 and a further of the at least two representation levels 42 comprises at least one further partial representation of the object 60.

Furthermore, the user can select one of the objects 60 to be individualized in step 110. Object selection data 41 of the object 60 to be individualized are generated by the selection in the user interface.

The object selection data 41 can be received with step 112 in the scope of a first user input via the user interface. Thereafter, the object selection data 41 can be transmitted with step 106 from the purchasing system 12 to the inventory management system 14. The inventory management system 14 can comprise a database 33 in this case, which comprises object data 46, 48, 50 for a plurality of objects.

Based on the object selection data 41, a data set 44 can be generated from the object data 46, 48, 50 by means of the inventory management system 14 in step 114. The data set 44 can be transmitted from the inventory management system to the purchasing system 12 with a repetition of step 106.

In step 116, a digital representation is carried out from the object data 46, 48, 50 of the data set 44. Furthermore, a symbol 58 which is based on individualization data 52 is projected at an arbitrary selection position 62, 64, 66. In this case, a representation of the symbol 58 can be adapted to the selection position 62, 64, 66 in step 118. A user can thus analyze and manipulate the object 60 to be individualized with the symbol 58 at one of the selection positions 62, 64, 66 in order to position the symbol 58 at a different selection position 62, 64, 66. Furthermore, the user can select one or more selection positions 62, 64, 66, at which a symbol 58 is to be arranged in the individualized object 60.

In the scope of a further user input in step 120, at least one selected selection position 62, 64, 66 for individualization data 52 on the object 60 to be individualized is received using the user interface 16.

In combination with the object data 46, 48, 50 of the data set 44 and the individualization data 52, object configuration data 43 are prepared by means of the purchasing system 12 from the at least one selected selection position 62, 64, 66 in step 122. Furthermore, price data 45 based on the object configuration data 43 can be determined by means of the purchasing system 12 in step 124. The object configuration data 43 and the price data 45 can be displayed in step 126 via the user interface 16. This enables a user to check the configuration of the object and the prices. The price data 45 and the object configuration data 43 can be transmitted from the purchasing system 12 to the inventory management system 14 in a further repetition of step 106.

Finally, in step 128, offer and/or order data 26 for the object 60 to be individualized are generated from the price data 45 and the object configuration data 43 by means of the inventory management system 14.

The invention is not restricted to one of the above-described embodiments, but rather is modifiable in manifold ways.

All features and advantages arising from the claims, the description, and the drawings, including constructive details, spatial arrangements, and method steps, can be essential to the invention both as such and also in greatly varying combinations.

LIST OF REFERENCE NUMERALS 10 application
12 purchasing system
14 inventory management system
16 web browser
18 data interface
20 data interface
22 data interface
24 author system
26 offer and/or order data
28 3D data
30 level data
31 components and rules
32 checkout module
33 database
34 visualization module
36 control module
38 components and rules
40 data
41 object selection data
42 representation levels
43 object configuration data
44 data set
46 object component data
48 printing positions
50 combination data
52 individualization data
54 3D printing surface
56 3D rendering system
58 symbol
60 object
62 selection positions
64 selection positions
66 selection positions
70 computer system
72 input unit
74 output unit
76 processor unit
78 storage unit It is claimed:

1. Computer-implemented method for preparing offer and/or order data of an object to be individualized, wherein the method comprises the following steps:
   providing a purchasing system having a user interface, an inventory management system, and a data interface between the purchasing system and the inventory management system in a computer system;
   providing individualization data for individualizing the object in a storage unit of the computer system;
   receiving a first user input comprising object selection data of the object to be individualized via the user interface;
   receiving a further user input comprising at least one selected selection position for individualization data on the object to be individualized;
   transmitting data via the data interface after at least one of the above-mentioned steps between the purchasing system and the inventory management system, wherein the data comprise at least the object selection data, the at least one selected selection position, a data set of object data of the object to be individualized, wherein the object data define object components and at least two selection positions for the individualization data on an object, object configuration data, which are based on the at least one selected selection position, the object data, and the individualization data, and/or price data based on the object configuration data; and
   generating offer and/or order data for the object to be individualized from the price data and the object configuration data by means of the inventory management system;
   wherein the method comprises the following steps before the reception of the first user input:
   displaying a digital representation of objects to be individualized via the user interface; and
   selecting one of the objects to be individualized by a user to generate the object selection data;
   wherein the digital representation comprises at least two representation levels, wherein one of the at least two representation levels comprises a first partial representation of the object and a further of the at least two representation levels comprises at least one further partial representation of the object, wherein an overlay of the partial representations displays an overall representation of the object and individual partial representations of the object are exchangeable or manipulable without changing the other partial representations, wherein partial representations can be stacked, wherein a first symbol at a first position of a first partial representation stacked below a second symbol at a second position of a second partial representation is visible on the object through a transparent image region of the second symbol at the second position of the second partial representation, and wherein the overall representation of the object is visible with the first and second symbols.

2. Computer-implemented method according to claim 1, characterized in that, after the reception of a first user input, the object selection data are transmitted from the purchasing system to the inventory management system, wherein the inventory management system comprises a database, which comprises object data for a plurality of objects; wherein the method comprises the following step;
preparing the data set from the object data based on the object selection data by means of the inventory management system;
wherein the data set is transmitted from the inventory management system to the purchasing system.

3. Computer-implemented method according to claim 2, characterized in that the projection of a symbol comprises the following substep:
preparing a representation of the symbol, which is adapted to the selection position.

4. Computer-implemented method according to claim 1, characterized in that the method comprises the following step before the reception of the further user input:
generating a digital representation from the object data of the data set and projecting a symbol based on the individualization data at an arbitrary selection position.

5. Computer-implemented method according to claim 1, characterized in that the method comprises the following step after the reception of the further user input:
preparing the object configuration data from the object data of the data set, the at least one selected selection position, and the individualization data by means of the purchasing system;
determining price data based on the object configuration data by means of the purchasing system; and
wherein the price data and the object configuration data are transmitted from the purchasing system to the inventory management system.

6. Computer-implemented method according to claim 1, characterized in that the user interface is a web browser.

7. Computer-implemented method according to claim 1, wherein the object data define a manufacturing method, which is linked to at least a part of the object data.

8. Computer-implemented method according to claim 1, characterized in that the method comprises the following step before the determination of price data based on the object configuration data by means of the purchasing system:
displaying the object configuration data and the price data via the user interface.

9. Computer-implemented method according to claim 1, characterized in that the object data comprise object component data, printing positions, which define the selection positions, and comprise combination data, wherein the combination data define rules for the combination of object component data and selection positions.

10. Computer-implemented method according to claim 1, wherein the overall representation of the object is visible around and surrounding the first and second symbols.

11. Computer-implemented method according to claim 1, wherein the transparent image region of the second symbol is visible over the first symbol, and wherein the first and second symbols are visible on the object.

12. Computer-implemented method according to claim 1, wherein the first symbol and the second symbol are copies of a third symbol that is also overlaid at a third position of a third partial representation on the overall representation of the object.

13. Computer-implemented method according to claim 1, further comprising receiving a user input selecting of one of the first or second positions on the object at which to generate the offer and/or order data for the object to be individualized.

14. Computer-implemented method according to claim 1, wherein the color and the design of the first and second symbol are adapted to the product by having data required by data from the product in an algorithmic manner that considers a HSV (hue saturation value) color space.

15. A non-transitory computer-readable medium having instructions executable on a computer, which, when executed on a computer, cause the computer to carry out the following steps:
providing a purchasing system having a user interface, an inventory management system, and a data interface between the purchasing system and the inventory management system in a computer system;
providing individualization data for individualizing the object in a storage unit of the computer system;
receiving a first user input comprising object selection data of the object to be individualized via the user interface;
receiving a further user input comprising at least one selected selection position for individualization data on the object to be individualized;
transmitting data via the data interface after at least one of the above-mentioned steps between the purchasing system and the inventory management system, wherein the data comprise at least the object selection data, the at least one selected selection position, a data set of object data of the object to be individualized, wherein the object data define object components and at least two selection positions for the individualization data on an object, object configuration data, which are based on the at least one selected selection position, the object data, and the individualization data, and/or price data based on the object configuration data;
generating offer and/or order data for the object to be individualized from the price data and the object configuration data by means of the inventory management system;
wherein the method comprises the following steps before the reception of the first user input:
displaying a digital representation of objects to be individualized via the user interface; and
selecting one of the objects to be individualized by a user to generate the object selection data;
wherein the digital representation comprises at least two representation levels, wherein one of the at least two representation levels comprises a first partial representation of the object and a further of the at least two representation levels comprises at least one further partial representation of the object, wherein an overlay of the partial representations displays an overall representation of the object and individual partial representations of the object are exchangeable or manipulable without changing the other partial representations, wherein partial representations can be stacked, wherein a first symbol at a first position of a first partial representation stacked below a second symbol at a second position of a second partial representation is visible on the object through a transparent image region of the second symbol at the second position of the second partial representation, and wherein the overall representation of the object is visible with the first and second symbols.

16. Computer program product of claim 15, wherein the overall representation of the object is visible around and surrounding the first and second symbols."

17. Computer program product of claim 15, wherein the transparent image region of the second symbol is visible over the first symbol, and wherein the first and second symbols are visible on the object.

18. Computer program product of claim 15, wherein the first symbol and the second symbol are copies of a third symbol that is also overlaid at a third position of a third partial representation on the overall representation of the object.

19. Computer program product of claim 15, further comprising receiving a user input selecting of one of the first or second positions on the object at which to generate the offer and/or order data for the object to be individualized.

20. Computer program product of claim 15, wherein the color and the design of the first and second symbol are adapted to the product by having data required by data from the product in an algorithmic manner that considers a HSV (hue saturation value) color space.

* * * * *